United States Patent [19]

Veltman et al.

[11] Patent Number: 4,793,832

[45] Date of Patent: Dec. 27, 1988

[54] AIR PURIFICATION AND TEMPERATURE CONTROLLING SYSTEM AND METHOD

[75] Inventors: Joost Veltman, San Jose; Ram L. Malik, Fremont; Michael D. Dickens, Danville, all of Calif.

[73] Assignee: FMC Corporation, Chicago, Ill.

[21] Appl. No.: 57,634

[22] Filed: Jun. 4, 1987

Related U.S. Application Data

[63] Continuation-in-part of Ser. No. 852,006, Apr. 14, 1986, Pat. No. 4,732,579.

[51] Int. Cl.⁴ .............................................. B01D 53/04
[52] U.S. Cl. .......................................... 55/23; 55/26; 55/27; 55/76; 55/180; 55/208; 55/267; 55/387
[58] Field of Search ................................. 55/23, 25-27, 55/58, 62, 74-76, 162, 179, 180, 182, 208, 267, 387, 389

[56] References Cited

U.S. PATENT DOCUMENTS

| | | | |
|---|---|---|---|
| 1,831,644 | 11/1931 | Adair et al. | 55/33 |
| 2,497,421 | 2/1950 | Shiras | 55/27 X |
| 2,663,669 | 12/1953 | Barnes | 55/27 X |
| 3,221,477 | 12/1965 | Arnoldi et al. | 55/31 |
| 3,800,507 | 4/1974 | Howell et al. | 55/33 |
| 3,880,616 | 4/1975 | Myers et al. | 55/62 |
| 3,989,478 | 11/1976 | Jones | 55/23 X |
| 4,080,103 | 3/1978 | Bird | 55/267 X |
| 4,126,000 | 11/1978 | Funk | 55/23 X |
| 4,169,506 | 10/1979 | Berry | 55/23 X |
| 4,231,768 | 11/1980 | Seibert et al. | 55/179 |
| 4,255,406 | 3/1981 | Isalski et al. | 55/23 X |
| 4,285,917 | 8/1981 | Knight | 423/224 |
| 4,312,851 | 1/1982 | Isalski et al. | 55/23 X |
| 4,322,225 | 3/1982 | Bellinger et al. | 55/27 |
| 4,349,357 | 9/1982 | Russell | 55/21 |
| 4,392,871 | 7/1983 | Almlöf et al. | 55/23 |
| 4,449,990 | 5/1984 | Tedford, Jr. | 55/26 |
| 4,522,636 | 6/1985 | Markbreiter et al. | 55/23 |
| 4,560,394 | 12/1985 | McDonald et al. | 55/16 |

FOREIGN PATENT DOCUMENTS

208824 10/1959 Austria .................................. 55/23

OTHER PUBLICATIONS

Article entitled Fixed-Bed Adsorption by H. M. Barry appearing in publication Chemical Engineering dated Feb. 8, 1960.

A Holset Engineering Company brochure entitled H3B Turbo Charger.

Primary Examiner—Robert Spitzer
Attorney, Agent, or Firm—A. J. Moore; H. M. Stanley; R. B. Megley

[57] ABSTRACT

A system and method is disclosed for providing a continuous supply of clean air at a desired temperature to the crew compartment of a vehicle when in an environment contaminated by nuclear, biological or chemical warfare agents. Exhaust gases from the vehicle's engine is used to drive a first compressor which directs compressed and heated air to a precooler, an aftercooler, a heat exchanger and a pressure swing adsorption system which removes all known contaminates from the air providing clean output air. The clean air is expanded and cooled by a turboexpander which drives a secondary compressor and a coolant air compressor. A temperature controlled circuit is provided to control the temperature of the air throughout the circuit and in the crew compartment at the desired levels.

32 Claims, 5 Drawing Sheets

FIG_1

AIR PURIFICATION AND TEMPERATURE CONTROLLING SYSTEM AND METHOD

CROSS REFERENCE TO RELATED APPLICATIONS

The present application is a continuation-in-part of our prior application Ser. No. 852,006, filed Apr. 14, 1986, now U.S. Pat. No. 4,732,579, which issued on Mar. 22, 1988.

BACKGROUND OF THE INVENTION

1. Field of the Invention

The present invention pertains to a method and apparatus for purifying and thereafter changing the temperature of air, and more particularly relates to such a system for continuously removing hazardous nuclear, biological and chemical warfare agents from air and supplying cool clean air to standard masks and microclimate suits worn by personnel within the crew compartment of a combat vehicle or the like with optimum energy consumption.

2. Description of the Prior Art

A soldier runs the risk of being exposed to several hazardous materials such as chemical and biological warfare agents, and radioactive fallout from nuclear detonations. In conjunction with various forms of the protective clothing or shelters, he requires a source of cool and clean air to breathe and to minimize fatigue and shock. The conventional means of providing cool and clean air to the crew in a vehicle is through the use of disposable charcoal filters and a separate air conditioning device. The disposable filters represent a considerable logistical burden to the user since they are large, heavy, have a limited useful live, are expensive and can be used only once. After use, the filters can become contaminated, are hazardous to handle and must be replaced. Thus, a large supply of filters must be available and the vehicle may have to be moved to a clean area before the filters are changed thereby reducing the vehicle battlefield availability. The vehicle, and personnel therein, could be rendered useless if replacement filters were unavailable while in a chemical warfare environment. Also, the use of a separate air conditioner in many vehicles may be undesirable or impractical due to space limitations in the vehicle. Cool air is required by the crew to breathe and prevent heat stress, when wearing protective clothing to perform extended duties in a contaminated battlefield.

SUMMARY OF THE INVENTION

In accordance with the present invention a first embodiment discloses a single system which continuously provides clean air from which nuclear, biological and chemical warfare agents have been removed; and which air is cooled to about 70° F. (Fahrenheit) before it enters conventional protective suits and masks worn by the crew in the crew compartment within a vehicle. The conventional masks and protective suits (not shown) have fluid flow passages therein through which the clean air flows at about 70° F. to maintain the crew at a desirable temperature, and provides a source of clean cool air which the crew breathes. The incoming contaminated air is increased in pressure by a first turbocharger driven by energy from the otherwise wasted exhaust gases from the engine; or if the engine is not running, the turbocharger is driven by an alternate power source such as a combustor within which fuel is burned. The high pressure air, from the compression turbine of the turbocharger, when powered by either source of energy, is cooled to increase its density and is then directed into a secondary turbocompressor to increase its pressure and is again cooled before being directed into one bed of a pressure swing adsorption system which together with pre-filters removes all contaminates from the air. These pre-filters may be incorporated within the pressure swing adsorption system if desired. The high pressure clean air discharged from the pressure swing adsorption system drives a turboexpander connected to the secondary turbocompressor of an energy recovery system and is discharged as cool clean air into the masks and protective suits worn by the crew. The air temperature provided to the crew is at about 70° F. and slightly above atmospheric pressure. A portion of the clean air is directed into another bed of the pressure swing adsorption system to regenerate (self-clean) that bed by purging all contaminates therefrom. At even intervals of about 30 seconds, the high pressure air and the purging air entering the two beds of the pressure swing adsorption system are reversed thus providing a continuous air purification and cooling system.

Although a pressure swing adsorption system is the preferred system, other sorption systems may be used. Sorption systems are defined as a "general term used to encompass the processes of adsorption, absorption, desorption, ion exchange, ion exclusion, ion retardation, chemisorption, and dialysis."

BRIEF DESCRIPTION OF THE DRAWINGS

FIG. 6 is a diagram illustrating a portion of a third embodiment of the invention illustrating a modified energy recovery system.

FIG. 7 is a diagram similar to FIG. 6 of a fourth embodiment of the invention illustrating another energy recovery system.

FIG. 8 is a diagram similar to FIG. 6 illustrating a fifth embodiment of the invention.

DESCRIPTION OF THE PREFERRED EMBODIMENT

Figure 1:
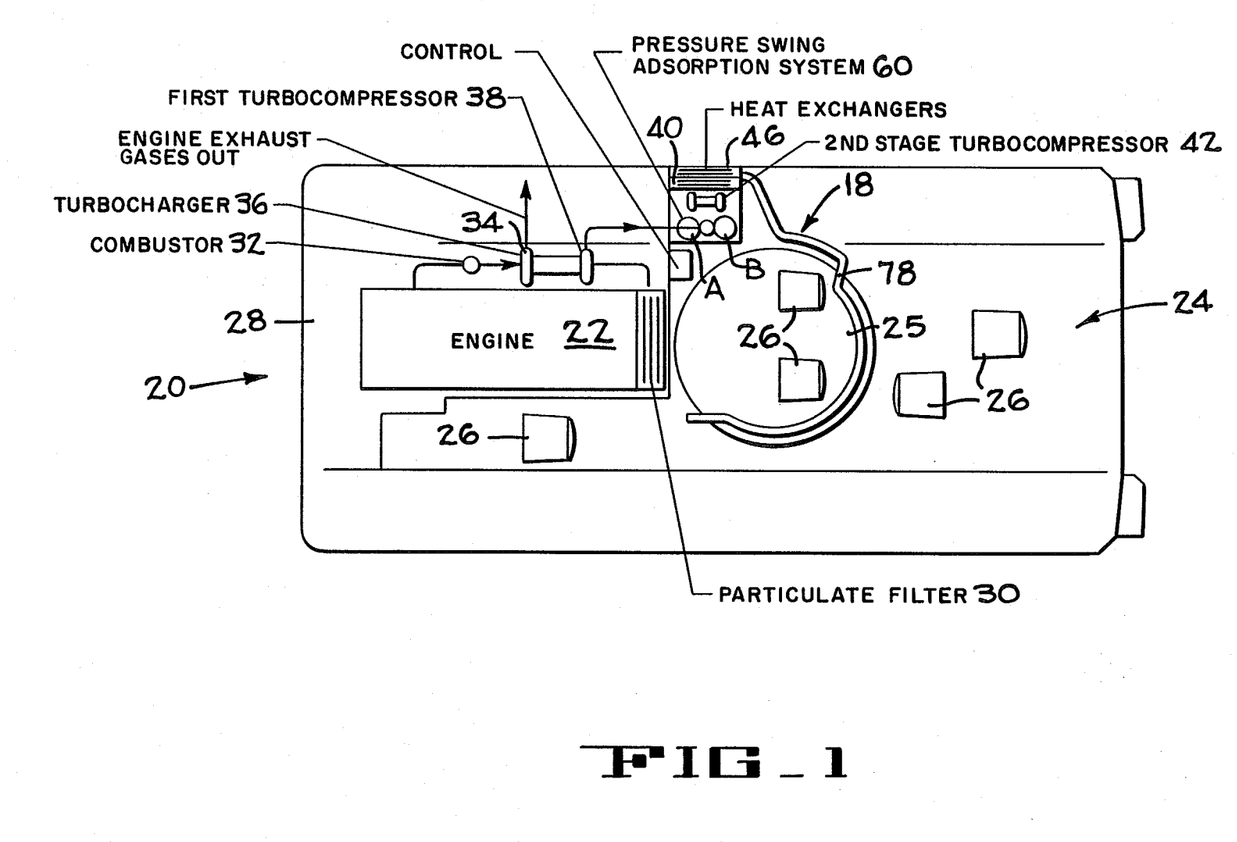
FIG. 1 is a diagrammatic plan of a military vehicle illustrating the location of the several components of the air purification and temperature controlling system of the present invention.

The air purification and temperature controlling system 18 (FIG. 1) of the first embodiment of the present invention is intended for use in combat vehicles 20 for continuously removing nuclear, biological and chemical contaminates from the air while controlling the temperature of the air for providing clean air at about 70° F. to conventional suits and masks (not shown) worn by the crew of the vehicle. It will be understood, however, that the system may be used in other environments where combustion power means, such as an engine is available, or from other sources of compressed air such as turbine bleed air from a turbine powered vehicle, jet aircraft, or similar power means. For example, the system may be used to provide clean cool air to one or more people in buildings, aircraft, ships, and private or commercial vehicles.

In accordance with the preferred embodiment of the present invention the military combat vehicle 20 (FIG. 1) includes an engine 22 which drives wheels or tracks (not shown) and other powered components in the vehicle. The vehicle includes an enclosed crew compartment 24 which may include a turret 25 with seats 26 therein for the crew, five seats being illustrated in FIG. 1.

Figure 2:
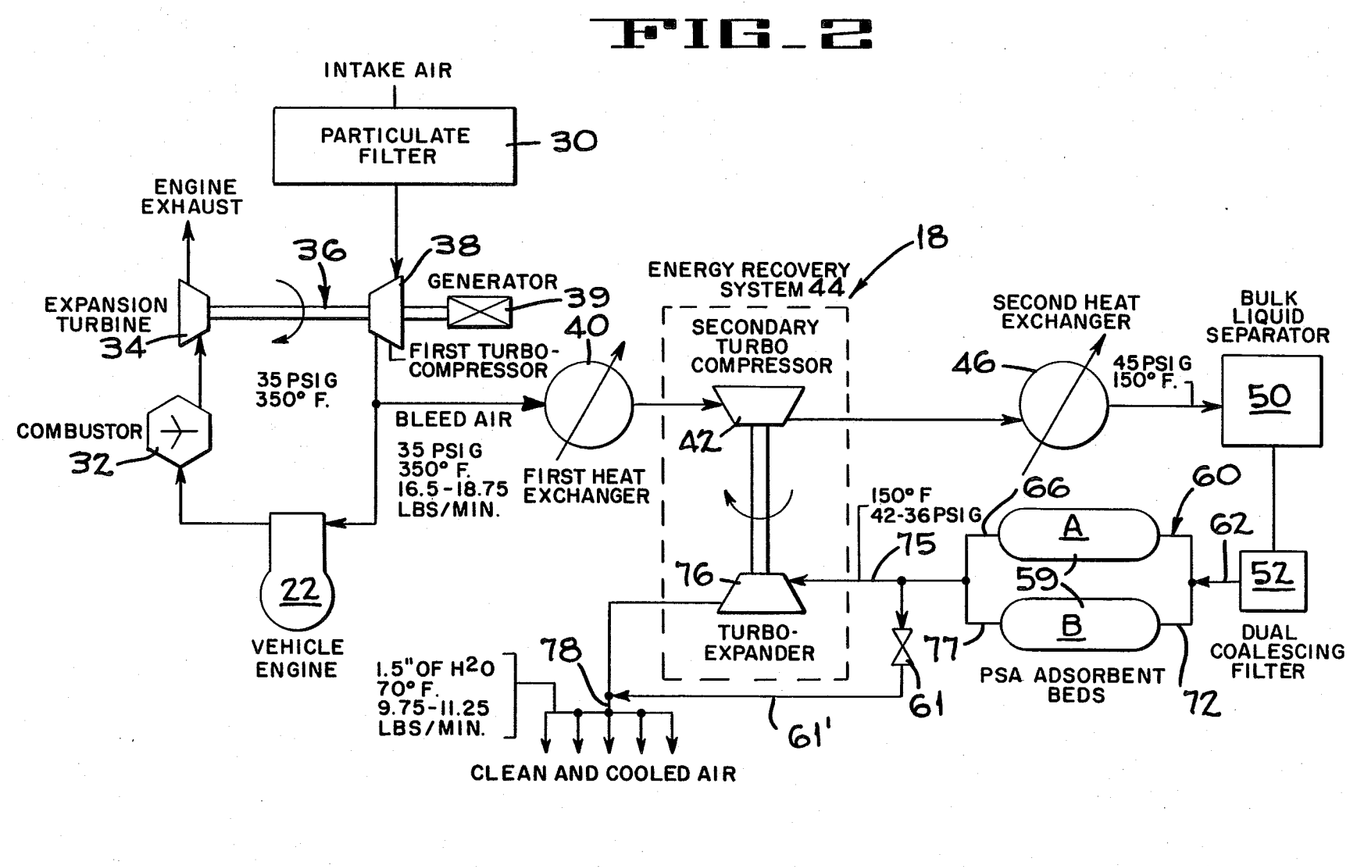
FIG. 2 is a diagrammatic view of the first embodiment of a purification and temperature controlling system of the present invention illustrating the directional flow of the air and engine exhaust gases indicating approximate temperature, pressures and pounds of mass per minute at different locations in the system; and with the details of the purging flow not shown.

The engine 22 is located in a separate compartment 28 and includes a conventional completely regenerative particulate filter 30 (FIG. 2) which removes approximately 95% of the dust and other particulates from the air. A major portion of the filtered air is used in the combustion chamber of the engine 22. The exhaust gases from the engine pass through a combustor 32 (to be described hereinafter) and drives an expansion turbine 34 of a turbocharger 36 such as a Holset H3B turbocharger, manufactured by Holset Engineering Company Ltd., Turnbridge, Huddersfield, England. The turbocharger 36 also includes an air compression stage 38 which is driven by the expansion turbine 34 and receives air from the filter 30 and compresses the air. The compression of the air with the compression stage 38 has the effect of heating the air, raising its pressure and thus adding energy to the air. The turbocharger 36 may also drive another mechanism in the vehicle, such as a generator 39 as illustrated in FIG. 2.

The compressed air discharged by the compression stage 38 is at a relatively low, energy conserving, pressure; preferably about 35 psig. and at a temperature of about 350° F. As previously mentioned, a major portion of this compressed air is directed into the engine 22. The remaining pressurized bleed air to be further purified and cooled is first directed through a first heat exchanger 40, which is preferably a conventional air-to-air heat exchanger. The cooling of the air by the heat exchanger 40 increases the density of the bleed air prior to entering a secondary turbocompressor 42 of an energy recovery system 44. If the air was not cooled before entering the secondary compressor 42, the secondary air compressor would be unable to compress the thin air the desired amount. The air from the secondary compressor then flows into a second heat exchanger 46. The heat exchangers 40 and 46 may be adjusted to provide the desired output pressure and temperature which is preferably about 45 psig. and lower than 150° F.

The heated and pressurized air then passes through a bulk liquid separator 50 which separates condensed vapors from the incoming air and discharges the separated fluids externally of the vehicle. The air then passes through an optional dual coalescing filter 52 which likewise directs the separated fluids externally of the vehicle. The bulk liquid separator 50 and the coalescing filter 52 protect the absorption beds 59 of the pressure swing adsorption system 60 from excessive absorption of liquids The preferred embodiment for controlling the air temperature is provided by temperature control valve 61 by passing a portion of the hot filtered air and mixing it via connecting tube 61'into manifold 78 to obtain the desired air comfort level.

Figure 3:
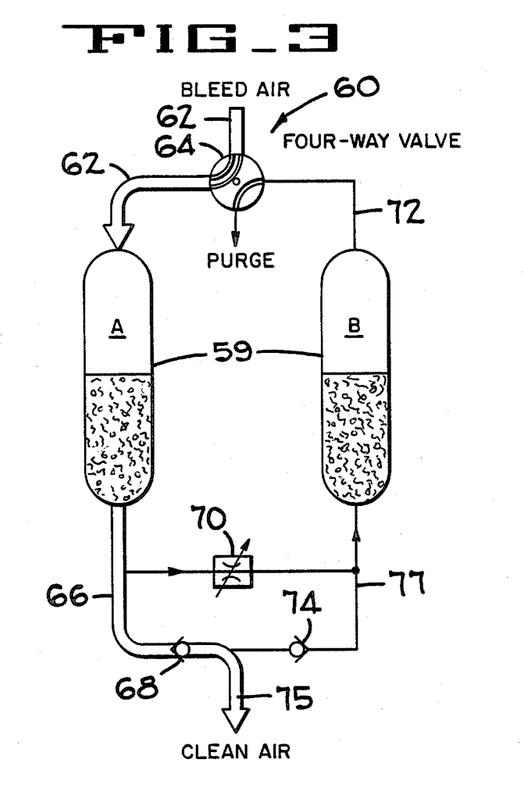
FIG. 3 is a diagrammatic view of the pressure swing adsorption system illustrating a first bed of the pressure swing adsorption system purifying incoming air, while a second bed of the system is being regenerated by purging contaminates therefrom with a small amount of clean air bled from the first bed, said view also illustrating a first location of the conduits used for purging contaminants from the bed.

The pressure swing adsorption system 60 (FIGS. 3 and 4) includes two tanks A and B, which system is a known regenerative (self-cleaning) adsorption system using an adsorption bed 59 in each tank. As shown in FIG. 3, the compressed air first enters tank A through conduit 62 having a four-way inlet-purge valve 64 therein. Water, hydrocarbons and chemical agents are adsorbed in the bed of tank A while purified and dry air passes out of the tank A through conduit 66 at a pressure slightly lower than the inlet pressure. This purified air is delivered through a check valve 68 for continuous downstream use. A portion of this pure dry air is expanded through an orifice 70 to lower its pressure and passes through the bed of tank B in a direction opposite to the normal flow of contaminated air through tank B as indicated by the arrows. This flow purges the contaminates from the adsorbent material in the bed of the tank B and directs them through conduit 72 and the four-way valve 64 for discharge externally of the vehicle. A check valve 74 is held closed by the high pressure air in conduits 66 and 75 thus preventing high pressure air from flowing past check valve 74. At the end of a predetermined adsorption time, for example 30 seconds, the four-way inlet-purge valve 64 is switched to the position shown in FIG. 4. The clean adsorbent material in tank B then adsorbs the contaminants from the incoming air entering tank B through conduit 72 and flows out of tank B through conduits 77, check valve 74 and conduit 75. A portion of the clean air is expanded as it moves past orifice 70 and passes through tank A to purge the contaminates from the adsorbent material in the tank A which flows to the outer atmosphere through conduit 62 and four-way valve 64. This cyclic process continuously reverses the four-way valve 64 at the predetermined adsorption time interval. Any conventional means such as a conventional timer and electric or hydraulic power unit (not shown) is provided for reversing the valve 64. The expanded purge air drops in pressure between about 3–9 psig after expansion in response to its purging flow through the beds in tank A and B.

The hot supply air drops in pressure between about 6–16 psig as it passes through the beds 59 and is directed through the conduit 75 into a turboexpander 76 (FIG. 2) of the energy recovery system 44. Expansion of the air through the turboexpander 76 drives the secondary turbo compressor 42 and also cools the air to about 70° F. for discharge directly into the crew compartment 24 or into the masks and suits of the crew in the crew compartment 24 of the vehicle 20 through the normal heating ducts or manifolds 78 provided in the vehicle.

The volume of the clean cool air is about 9.75–11.25 lbs/minute at a pressure of about 1.5" of water.

Figure 4:
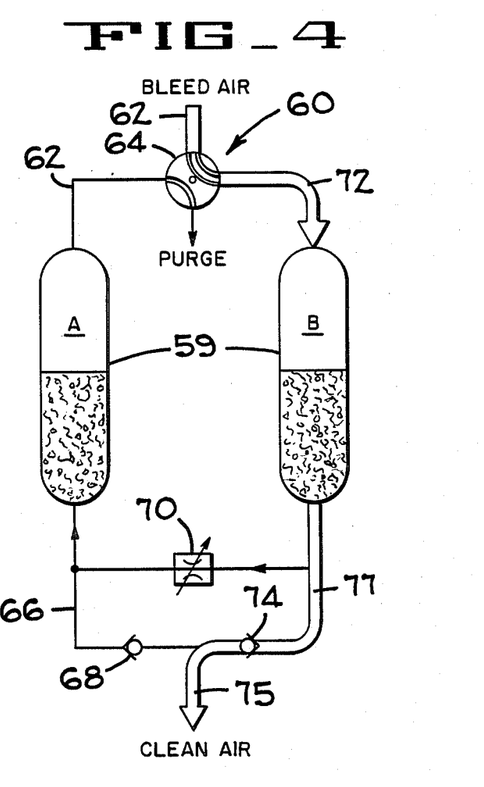
FIG. 4 is similar to FIG. 3 but illustrates the second bed receiving incoming air and the first bed being regenerated.

The pressure swing adsorption system 60 and the series of regenerative (self-cleaning) filters (not shown) in the beds 59 in the tanks A and B eliminate all chemical warfare agents completely. All of the liquids, particulates, and aerosol contaminants known to be a threat have been removed by the preceding particulate filter 30, bulk liquid separator 50, and dual coalescing filter 52.

Figure 5:
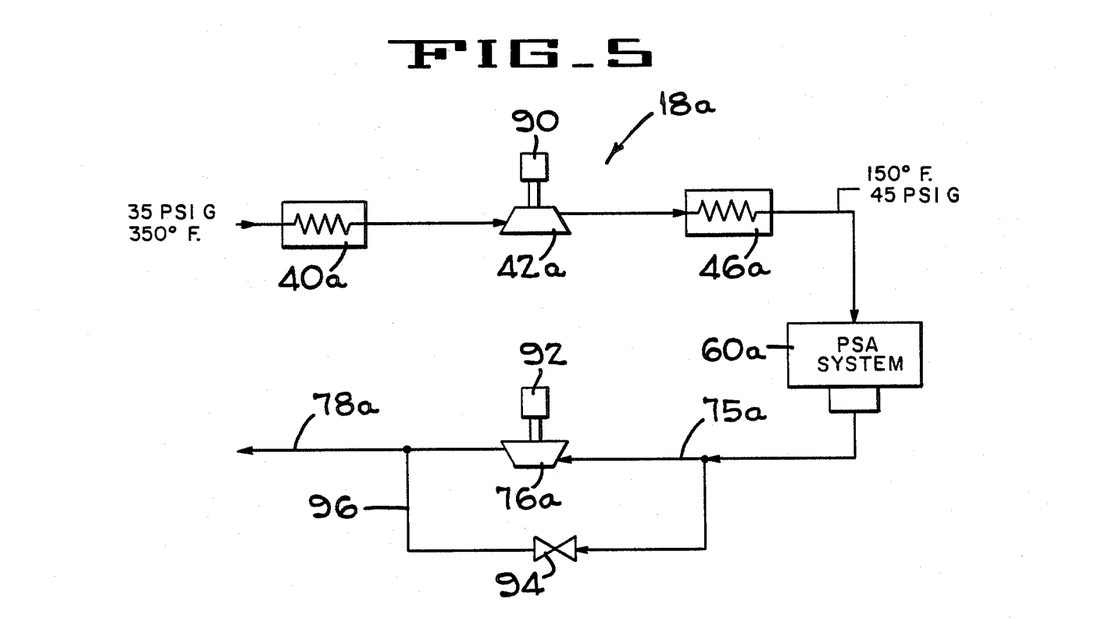
FIG. 5 is a diagram of a portion of a second embodiment of the invention downstream of the first turbocompressor of the first embodiment illustrating separate drives for the secondary turbocompressor and turboexpander.

FIG. 5 illustrates a portion of a second embodiment 18a of the air purification and temperature controlling system 18 (FIG. 2) of the present invention, which portion is downstream of the first turbocompressor 38 that is driven by exhaust gases entering the expansion turbine 34 (FIG. 2). The second embodiment 18a adds certain optional features to the system illustrated in FIG. 2.

Since most of the components of the second embodiment of the temperature controlling system 18a are similar to those of the first embodiment, parts of the second embodiment that are equivalent to those of the first embodiment will be assigned the same numerals followed by the letter "a.".

Compressed air at about 35 psig. and 350° F. is directed through the first heat exchanger 40a which cools the hot bleed air before entering the secondary turbocompressor 42a, which turbocompressor is not coupled to the turboexpander 76a as in the first embodiment but is driven by a motor 90 such as an electric or hydraulic motor. The air is then passed through the second heat exchanger 46a before being cooled to about 150° F at about 45 psig. The air passing through the heat exchangers 40a and 46a is cooled by atmospheic air being blown through the heat exchangers as in the first embodiment by conventional blowers (not shown). The air at approximately 45 psig passes through the pressure swing adsorption system 60a where it is clean, and then passes through conduit 75a into the turboexpander 76a and drives a mechanism in the vehicle such as a fan or generator 92. If a generator is used, the power from the generator may be used to drive the motor 90 or to drive other mechanisms in the vehicle. An adjustable expansion valve 94 is connected in parallel with the turboexpander 76a by a conduit 96 and may be adjusted to control the desired flow of air through the turboexpander and thus the temperature of the clean air entering the crew compartment 24 (FIG. 1) of the vehicle 20 from outlets in ducts 78a (FIG. 5). By adjusting the valve 94 and/or the speed of the motor 90, the clean air discharged into the crew compartment 24 (FIG. 1) may be either heated or cooled to provide the desired temperature within the crew compartment 24.

A third embodiment of the temperature controlling system 18b of the invention is disclosed in FIG. 6 and is similar to the first embodiment. Parts of the third embodiment that are equivalent to the first embodiment will be assigned the same numerals followed by the letter "b".

Compressed air at about 35 psig and 350° is directed into the first heat exchanger 40b which cools the air before it enters the secondary turbocompressor 42b by causing atmospheric air to flow therethrough and expel some of the heat to the atmosphere. The secondary turbocompressor 42b is driven by the turboexpander 76b. Air from the turbocompressor 42b flows through a closed heat exchanger 100 and through the pressure swing adsorption system 60b providing clean air in conduit 75b. The heat exchanger 100 transfers heat, not only to the atmosphere, but also to the heat transfer coils or tubes 102 that are connected to the conduit 75b by a conduit 104 having a temperature controlled valve 108 therein. The other side of the tubes 102 are connected to a downstream portion of the conduit 78b by a conduit 106. Flow divider 110 diverts part of the main air flow through the coil 102. The remaining air flows through turboexpander 76b and out of conduit 75b, through the turboexpander 76b which drives the secondary turbocompressor 42b as previously stated. Thus, a portion or all of the clean air discharged from the pressure swing adsorption system 60b can flow through the tubes 102 and draw a desired amount of heat from the second heat exchanger 100. By controlling the temperature controlled valve 108 the temperature of the clean air entering the turboexpander 76b may be controlled so that the air which is directed into the crew compartment through conduit 78b may be heated above 70° F. during winter operation or may be cooled to or below 70° F. as in the first embodiment of the invention for summer use. It is apparent, therefore, that the heat exchanger 100, the valve 108, the flow divider 110 and the turbocompressor 76b act as an energy recovery system and for selectively directing heated air or cooled air into the crew compartment 24 of the vehicle 20.

A fourth embodiment of the temperature controlling system 18c of the present invention is disclosed in FIG. 7 and is similar to the first and third embodiments of the invention. Parts of the fourth embodiment that are similar to the first embodiment will be assigned the same numerals followed by the letter "c".

Hot compressed bleed air from the first turbocompressor 38 (FIG. 2) is directed through a first closed heat exchanger 114 which includes first tubes 116 through which the hot bleed air flows to the secondary turbocompressor 42c (FIG. 7). The bleed air then flows through the second heat exchanger 46c, the pressure swing adsorption system 60c, conduit 75c, the turboexpander 76c and conduit 78c to the crew compartment. In this embodiment of the invention the energy recovery system includes second coils or tubes 118 in the closed heat exchanger 114 which draws heat from the first tubes 116. The second tubes 118 are connected to the output conduit 78c by conduit 120 with adjustable temperature controlled valve 122 therein, and a second conduit 124. A flow control device 126 is disposed between conduits 120, 124 in conduit 78c. Thus, if it is desired to direct cool air at about 70° F. into the crew compartment, as in the first embodiment, the valve 122 is closed or partially closed to provide the desired temperature. If the vehicle 20 is operating in a cold environment where hot air rather than cool air is desired in the crew compartment, most, if not all, of the clean air from the turboexpander 76c is directed through temperature controlled valve 122, tubes 118, and conduit 124 and out of the conduit 78c into the compartment.

A fifth embodiment of the temperature controlling system 18d is disclosed in FIG. 8 and is similar to the first and fourth embodiments. Parts of the fifth embodiment that are similar to the first embodiment will be assigned the same numerals followed by the letter "d".

Hot compressed bleed air from the first turbocompressor 38 (FIG. 2) is directed through first coils or tubes 130 in a closed heat exchanger 132 (FIG. 8), through the second turbocompressor 42d, through the second heat exchanger 46d, and through the pressure swing adsorption system 60d. Thereafter, if heating is desired, a portion or all of the clean air may flow through a conduit 134 having a first adjustable temperature controlled valve 136 therein, through second tubes 138 in the heat exchanger 132, and to the output side of the turboexpander 76d through a conduit 140 into conduit 78d. A flow divider 142 directs a portion of the air through temperature controlled valve 136 into conduits 134 add 140 for heating in heat exchanger 132 depending upon the amount of heat desired from the clean output air of the turboexpander 76d that is directed through conduit 78d into the crew compartment. If cool air is required in the crew compartment, the temperature controlled valve 136 is adjusted to prevent or substantially restrict flow of air therepast, increasing the flow past flow divider 142 depending upon the amount of cooling required in the crew compartment.

It will be understood that the closed heat exchangers 100 (FIG. 6) 114 (FIG. 7), and 132 (FIG. 8) each include coils or tubes within their housings, which housings are normally closed to the atmosphere when it is desired to heat the crew compartment. However, it will be understood that the housings may be partially opened to permit conventional fans in the vehicle to blow atmospheric air through the housings to cool the air passing through the tubes when desired.

In the normal operation of the several embodiments of the air purification and temperature controlling system 18 of the present invention, the expansion turbine 34 (FIG. 2) of the turbocharger 36 is driven by the exhaust gases from the engine 22 and the turbocompressor 42 is driven by the turboexpander 76 of the energy recovery system 44 thereby requiring no additional power to operate the system 18. However, during combat it is sometimes desirable to place the vehicle 20 in a "SILENT-WATCH" mode, at which time the engine is not running, thereby minimizing detection of the vehicle by heat sensors and sound detectors or the like. When under "SILENT-WATCH", fuel is directed into the combustor 32 (FIG. 2) which is burned to direct hot exhaust gases into the expansion turbine 34 of the turbocharger 36. The first turbocompressor 38 then directs air through the system as previously described to provide clean cool (or heated) air for the crew in the crew compartment 24 when the engine 22 is not operating.

An additional embodiment of an air purification and temperature controlling system 158 (FIG. 9) of the present invention is primarily intended for use in the combat vehicle 20 (FIG. 1) for continuously removing nuclear, biological and chemical contaminants from the air and providing clean air to the crew compartment 24, or into conventional suits and masks worn by the crew of the vehicle. The clean air may be cooled to about 70° F. when the vehicle is used in a hot climate; or may be heated to a desirable temperature when used in cold climates.

It will be appreciated that when using a pressure swing adsorption system in the automotive field, that the available power is limited to that of the engine. Therefore, it is desirable to recover heat energy from the engine which is normally wasted and to use this recovered energy to aid in purifying the air by converting potential energy into kinetic energy for driving at least one of the compressors as will be described below.

The air purification and temperature controlling system 158 (FIG. 9) of the additional embodiment of the invention receives ambient air from two inlet conduits 160 and 162. Intake air from inlet conduit 160 is drawn through a particulate filter 164 into a first compressor 166 which compresses the air to about 35 psig. (about 50 psia.) and directs a major portion of the heated and pressurized air into the intake of a vehicle engine 168.

Figure 9:
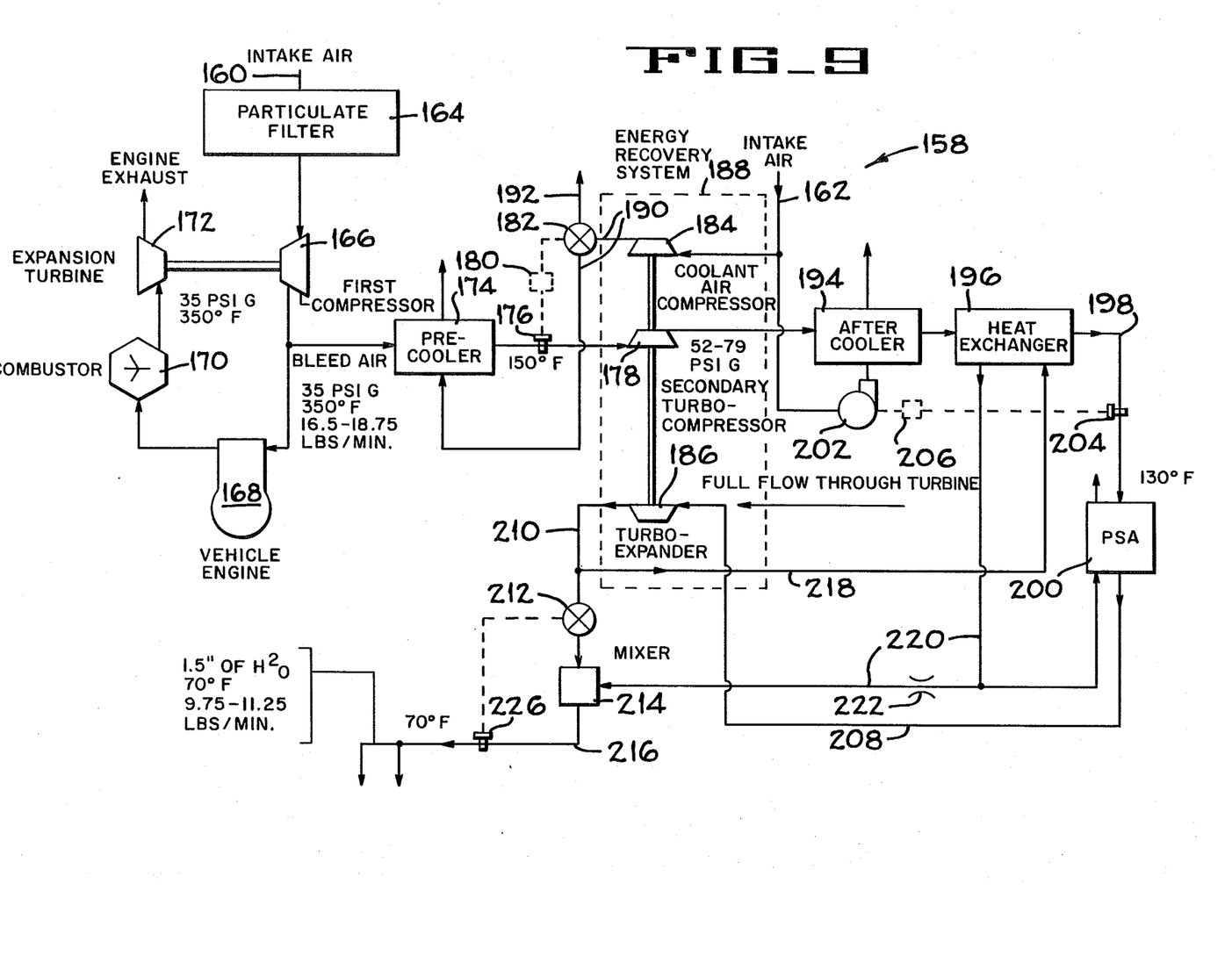
FIG. 9 is a diagrammatic view illustrating an additional embodiment of the invention.

The exhaust from the engine normally passes through a combustor 170 and is directed into an expansion turbine 172 which drives the first compressor 166. Another portion of the prefiltered and heated air from the first compressor 166 flows as bleed air at about 35 psig. and 350° F. into a first heat exchanger or precooler 174. All of the above components are substantially the same as those disclosed in the first embodiment and operate in the same manner.

The cooled air discharged from the precooler 174 flows past a temperature sensor 176 into a secondary compressor 178, which sensor is set at about 150° F. and communicates with a temperature controller 180 that actuates a baffle valve 182. The secondary compressor 178 and a coolant air compressor 184 are connected to and driven by a turboexpander 186 which together define an energy recovery system 188.

Signals from the temperature sensor 176 will cause the temperature controller 180 to adjust the position of the baffle valve 182 so that the compressed air from the compressor 184 will either be directed through a conduit 190, through the precooler 174 and to the atmosphere; or will be directed from the coolant air compressor 184 through the baffle valve 182 and conduit 192 directly to the atmosphere depending upon whether the temperature at the temperature sensor 176 is higher or lower than about 150° F., respectively. The compressed air from the secondary turbocompressor 178 is raised to a pressure between about 52-79 psig. and is directed through an after cooler 194, a heat exchanger 196, and a conduit 198 to the inlet of a pressure swing adsorption system (PSA system 200). Cooling air from inlet conduit 162 is directed through the cooler 194 by a driven fan 202 which is controlled by a temperature sensor 204 in conduit 198 and a temperature controller 206. The partially cleaned air from the secondary turbocompressor passes through the after cooler 194 and the heat exchanger 196 provides air to the PSA system 200 at about 130° F. The temperature controller 206 varies the speed of the fan 202 which is preferably driven by an electric or hydraulic motor (not shown).

All of the air which is purified after passing through the PSA system 200, except for a small amount used for purging the PSA system 200, flows through a conduit 208 into the expander 186 thereby driving both the secondary turbocompressor 178 and the coolant air compressor 184. The clean purified air discharged from the turboexpander 186 is cooled due to expansion and flows through a conduit 210, a flow and temperature control valve 212, and a mixer 214 before being discharged through a conduit 216 into the crew compartment 24 (FIG. 1) or into conventional suits and masks (not shown) worn by the crew of the vehicle.

After passing through the PSA system 200 and turboexpander 186, a minor temperture controlling portion of the air flows from conduit 210, through a conduit 218, a heat exchanger 196, and enters a conduit 220 having an orifice 222 therein. A portion of the air in the conduit 220 flows thoough and purges contaminates from the PSA system as described in regard to the first embodiment of the invention. Another portion of the clean air from conduit 220 passes through the orifice 222 and enters the mixer valve 214.

When a temperature above 70° is desired in the crew compartment of the vehicle, a temperature sensor 226 in conduit 216 sends a signal to control valve 212 causing the valve 212 to partially close thereby causing a larger than normal proportion of cool air to flow through conduit 218 and the heat exchanger 196 which heats the previously cooled air. This heated air then flows through conduit 220, is split into a PSA purging portion and a portion which flows through the orifice 222, mixer 214, and conduit 216 for distribution into the crew compartment of the vehicle at a temperature of about 70° F. The introduction of cooler air into the heat exchanger 196 will be detected by the temperature sensor 204 which sends a signal to controller 206 causing less intake air from conduit 162 to be blown through the after cooler 194 thereby increasing the temperature of the air to be purified to approximately 130° before it enters the heat exchanger 196.

If the vehicle is to be used in very hot climates, the temperature sensor 226 may be set below 70° F. thereby opening the valve 212 an additional amount thus causing a larger proportion of cool air to flow through the mixer 214 into conduit 216 and a lesser amount of cool air to flow through conduit 218 to the heat exchanger 196 thus causing the temperature sensor 204 to actuate controller 206 which causes the fan 202 to direct more atmospheric air through the after cooler 194 thereby retaining the desired 130° F. temperature at the inlet of the PSA system 200.

Also, if desired, the pressure entering the PSA system 200 from conduit 220 in conjunction with an orifice (not shown) may be used to shift a four-way inlet-purge valve (not shown but similar to valve 64 of the first embodiment) between its two operative positions.

It will be noted that the air purification and temperature controlling system 158 directs all of the purified air from the PSA system 200 into the turboexpander 186 thereby recovering a substantial amount of energy which would otherwise be lost. This recovered energy is used to provide the multiple functions of driving the turboexpander 186 which drives both the secondary turbocompressor 178 and the coolant air compressor 184, an at the same time cooling the air for discharge into the crew compartment of the vehicle, and reheating the clean purge air for purging the pressure swing adsorption system.

Other advantages of the system 158 are that it is light in weight, it uses only a small amount of power from the exhaust of the vehicle engine 168 or from the combustor 170, it requires only a small space in the usual confined area of a vehicle, and the several components of the system may be mounted at different locations in the vehicle where space is found and can be easily connected together by suitable conduits.

Some of the advantages of the air purification and temperature controlling system of the present invention over systems using the prior art carbon filters are as follows:

1. Carbon filters when treated with chromium salts produce a carcinogenic by-product which is harmful to health if used over an extended time period. The subject system does not produce such carcinogenic by-products.

2. Carbon filters require frequent replacement thus increasing the logistical burden for providing a ready supply of filters, increasing the contamination burden for used filters; and increasing exposure to the crew while changing filters in a contaminated area, or loss of tactical use of the vehicle when driven out of the contaminated area to change filters.

3. The system of the present invention is completely regenerative eliminating the need for replacement filters, except if using the optional self-purging coalescing filter which requires a change only once per year.

4. The system provides collective protection to all personnel in the combat vehicle from all known or suspected chemical agents, biological agents and nuclear particulates for an indefinite period of time.

5. The system provides pure clean air to the crew as well as cooling/heating the air to about 70° F.

6. The system is composed of a plurality of known and tested small components which may be placed at different locations in current and future vehicles and be interconnected by conduits thereby minimizing space problems in the vehicle.

7. The system reduces the overall energy consumption normally required by the pressure swing system by operating at relatively low pressures (30 to 45 psig.) and by recuperating otherwise wasted energy from the engine exhaust and from the pressurized air with the use of expansion tubines.

8. A carbon filter's life is reduced by high relative humidity whereas the pressure swing adsorption beds are not degraded by moisture.

9. Carbon filters have a relatively short shelf life whereas the pressure swing adsorption system and its supporting filters have an indefinite shelf life under various storage conditions.

The air purification and temperature controlling system of the present invention is specifically directed to supplying cool air at slightly above atmospheric pressure and about 70° F. to conventional masks and microclimate protective suits worn by at least one crew member of a combat vehicle. It will be understood, however, that certain of the claims are intended to be broad enough to cover similar larger systems which are capable of directing cooled or heated air directly into the crew compartments of other vehicles or structures, without requiring that the crew members wear protective suits, and which provide an atmosphere within the crew compartment that is slightly above atmospheric pressure and is maintained at a comfortable temperature of about 70° F. Such a system would, of course, require larger components for handling larger volumes of air including larger power units which use exhaust gases for driving the first expansion turbine.

From the foregoing description it is apparent that the air purification and temperature controlling system of the present invention removes dust and particulates as well as all known nuclear, biological and chemical agents used against the crews of combat vehicles, or other vehicles or structures, while at the same time changing the temperature of the air by heating or cooling the air to provide 70° F air to the crew. The system optimizes energy consumption by using exhaust gases from the engine to drive a first turbocompressor which directs heated compressed air into a second turbocompressor which is driven by an expansion turbine by means of clean air discharged from a pressure swing adsorption system thereby providing a continuous supply of cool clean output air to the protective suits worn by the crew when in the crew compartment of the vehicle at about 70° F. and at a pressure slightly above atmospheric pressure. The second-fifth embodiments discloses several systems for heating the air when the vehicle is used in cold climates to maintain the clean air supplied to the crew at about 70° F.

Although the best mode contemplated for carrying out the present invention has been herein shown and described, it will be apparent that modification and variation may be made without departing from what is regarded to be the subject matter of the invention.

What is claimed is:

1. A method of directing clean air at a desirable temperature to the crew compartment of a vehicle when in an environment of contaminated air comprising the steps of:

initially compressing and raising the temperature of the contaminated air;

subjecting the heated and compressed air to an initial cooling step for increasing the density of air;

compressing the initially heated and compressed air;

subjecting the heated and compressed air to a secondary cooling step for decreasing the temperature of the contaminated air to a temperature lower than that at said initial compression step;

passing the contaminated air through a heat exchanger;

directing the contaminated air received from said secondary cooling step through a regenerative pressure swing adsorption system for providing clean output air with the contaminants removed therefrom;

expanding and cooling the temperature of the clean output air before discharging a first portion of the clean cool output air into the crew compartment of the vehicle for use by the crew, and directing a second portion of the expanded and cooled output air through the heat exchanger for heating and subsequent mixing with the cool air for providing clean output air in the crew compartment at the desired temperature, and delivering clean heated purge air at a temperature greater than that of the contaminated air entering the pressure swing adsorption system for purging contaminates therefrom.

2. A method according to claim 1 and additionally comprising the steps of continuously sensing the temperature of the clean output air entering the crew compartment for maintaining the temperature at the desired level.

3. A method according to claim 1 and additionally comprising the steps of detecting the temperature of the contaminated air after being initially cooled, and directing a desired volume of coolant air in heat transfer relationship past the contaminated air during said second cooling step for discharging the contaminated air at a desired temperature prior to entering the heat exchanger.

4. A method according to claim 3 and additionally comprising the steps of detecting the temperature of the contaminated air entering the regenerative pressure swing adsorption system, and controlling the volume of coolant air during said second cooling step for maintaining a desired predetermined temperature of said contaminated air before entering the pressure swing adsorption system.

5. A method which receives intially compressed contaminated air at an elevated temperature, and which directs clean air at a desirable temperature to the crew compartment of a vehicle when in an environment of contaminated air, comprising:

subjecting the intially heated and compressed air to an initial cooling step for increasing the density of the air;

compressing the intitially heated and compressed air;

subjecting the heated and compressed air to a secondary cooling step for decreasing the temperature of the contaminated air to a temperature lower than that of the initially compressed air;

directing the contaminated air received from said secondary cooling step through a regenerative pressure swing adsorption system for providing clean output air with the contaminates removed therefrom; and expanding and controlling the temperature of the clean output air before discharging the clean output air into the crew compartment of the vehicle for use by the crew.

6. A method according to claim 5 wherein the initially compressed contaminated air is compressed to about 35 pounds per square inch gauge.

7. A method according to claim 5 wherein the initially compressed contaminated air is heated to about 350° F.

8. A method according to claim 5 wherein the expansion of the clean output air recovers sufficient energy to perform the step of compressing the initially heated and compraessed air.

9. A method which receives initially compressed contaminated air at an elevated temperature, and which directs clean air at a desireable temperature to the crew compartment of a vehicle when in an environment of contaminated air, the improvement which comprises the steps of:

subjecting the initially heated and compressed air to an initial cooling step for increasing the density of the air;

compressing the initially heated and compressed air;

subjecting the heated and compressed air to a secondary cooling step for decreasing the temperature of the contaminated air;

directing the contaminated air received from said secondary cooling step through a regenerative pressure swing adsorption system for providing clean output air with the contaminates removed therefrom; and expanding and controlling the temperature of the clean output air before discharging the clean output air at a desireable temperature into the crew compartment of the vehicle for use by the crew.

10. A method according to claim 9 wherein the expansion of the clean output air recovers sufficient energy to perform the stpe of compressing the intially heated and compressed air.

11. A method which receives initially compressed contaminated air at an elevated temperature, and which directs clean air at a desireable temperature to the crew compartment of a vehicle when in an environment of contaminated air, the improvement which comprises the steps of:

compressing the initially heated and compressed air;

subjecting the heated and compressed air to at least one cooling step for decreasing the temperature of the contaminated air;

directing the contaminated air received from said at least one cooling step through a regenerative pressure swing adsorption system for providing clean output air with the contaminates removed therefrom; and expanding and controlling the temperature of the clean output air before discharging the clean output air into the crew compartment of the vehicle for use by the crew.

12. A method according to claim 11 wherein the expansion of the clean output air recovers sufficient energy to perform the step of compressing the initially heated and compressed air.

13. A system for directing clean air at a desirable temperature to the crew compartment of a vehicle when in an environment of contaminated air comprising:
first compressor means for compressing and raising the temperature of the contaminated air;
precooler means for initially cooling the heated and compressed air for increasing the density of the air;
second compressor means for again compressing the initially heated and compressed air;
aftercooler means for again cooling the heated and compressed air for decreasing the temperature of the contaminated air to a temperature lower than that provided by said second compressor means;
heat exchanger means for circulating the cooled contaminated air from said aftercooler means therethrough;
pressure swing adsorption means for receiving the contaminated air from said heat exchanger means for providing clean output air with the contaminates removed therefrom;
turboexpander means for cooling and controlling the temperature of the clean output air before discharging the clean output air into the crew compartment of the vehicle for use by the crew; and
control means including a temperature responsive valve means and conduit means for controllably varying the flow of clean output air through the heat exchanger means into the crew compartment at the temperature desired by the crew in the compartment, said heat exchanger means receiving cool clean air from said turboexpander and directing a portion of said clean air through said pressure swing adsorption means at a higher temperature than that of the contaminated air entering said pressure swing adsorption system for purging contaminants from said pressure swing adsorption means.

14. A system according to claim 13 wherein all of the clean output air flows through said turboexpander means for cooling the clean output air; wherein said temperature responsive valve means is adjustable between a substantially open position causing a major portion of said cool clean output air to flow into said crew compartment, and a substantially closed position causing a substantial portion of said cool clean output air to pass through and be heated by said heat exchanger means for entering the crew compartment to provide warmer air for the crew.

15. A system according to claim 14 wherein the adjustable portion of said temperature responsive valve means is controlled by a first adjustable temperature sensor positioned in a portion of said conduit means entering said crew compartment.

16. A system according to claim 14 and additionally comprising a coolant air compressor, and a drive train connecting said coolant air compressor and said second compressor means to said turboexpander means; said turboexpander means recovering energy in response to expanding and cooling the clean output air thereby driving said coolant air compressor and said second compressor means.

17. A system according to claim 16 and additionally comprising a variable speed fan for directing cooling air through said aftercooler means; a second temperature sensor for detecting the temperature of the air entering said pressure swing adsorption means, a first temperature controller connected to said fan for driving said fan at a speed which will maintain the temperature of the air entering the pressure swing adsorption means at the desired temperature.

18. A system according to claim 17 and additionally comprising baffle valve means operatively connected to said coolant air compressor, and third temperature responsive means for controlling the position of said baffle valve means for maintaining the output temperature from said precooler means at the desired temperature by controlling the volume of coolant air from said coolant air compressor that is directed through said precooler means.

19. A system for providing clean air to the personnel compartment of a vehicle when in an environment of contaminated air comprising:
first compressor means for compressing and raising the pressure of the contaminated air;
first cooling means for cooling the coolant and compressed air to increase the density of the air;
second compressor means for again compressing the initially compressed air for raising the pressure thereof above that provided by said first compressor means;
second cooling means for lowering the temperature of the contaminated air below that of the air discharged from said second compressor means;
heat exchanger means for receiving the contaminated air from said second cooling means;
regenerable adsorption means for receiving the contaminated air from said heat exchanger means for providing clean output air with the contaminates removed therefrom;
turboexpander means for expanding and cooling the clean output air thereby recovering energy from the air being cooled before discharging the cleaned and cooled output air into the personnel compartment of the vehicle, said turboexpander means being connected in driving engagement to said second compressor means and using the energy recovered from expansion of the clean output air for driving said second compressor means; and
control means for varying the temperature of the clean air being directed into the personnel compartment by diverting a portion of the cooled expanded air through said heat exchanger for heating the clean output air to a temperature which provides the desired compartment temperature when recombined with the cooled clean air prior to discharge into the personnel compartment, cool clean air from said turboexpander means being reheated by said heat exchanger means and transmitted to said pressure swing adsorption means for purging contaminates from said pressure swing adsorption means.

20. A system according to claim 19 and additionally comprising a combustion power means in the vehicle for directing exhaust gases into said expansion turbine for driving the first compressor means.

21. A system according to claim 20 wherein said combustion power means is an internal combustion engine.

22. A system according to claim 19 wherein said combustion power means is a combustor.

23. A system according to claim 19 wherein said control means comprises a flow-temperature control valve downstream of said turboexpander means; mixer means downstream of said flow-temperature control valve, an adjustable temperature sensor downstream of said mixer means; first conduit means connected to said heat exchanger downstream of said turboexpander means and upstream of said flow temperature control valve; and second conduit means connected between said heat exchanger and said mixer; when said temperature sensor is adjusted to increase the temperature in said compartment, said flow-temperature control valve being partially closed thereby directing a greater portion of the clean air through said heat exchanger to provide additional heat to said compartment, and when said temperature sensor is adjusted to decrease the temperature in said compartment said flow-temperature control valve being opened an 24. A system which receives initially compressed contaminated air at an elevated temperature and pressure and which directs clean air at a desirable temperature to the crew compartment of a vehicle when in an environment of contaminated air, comprising:
means for intially cooling the heated and compressed air for increasing the density of the air;
means for again compressing the intially heated and compressed air;
secondary cooling means for again cooling the heated and compressed air for decreasing the temperature of the contaminated air to a temperature lower than that of said initial compressed air;
means for directing the contaminated air received from said second cooling means through a regenerative pressure swing adsorption system for providing clean output air with the contaminates removed therefrom; and
means for expanding and controlling the temperature of the clean output air before discharging the clean output air into the crew compartment of the vehicle for use by the crew.

25. A system according to claim 24 wherein the initially compressed contaminated air is compressed to about 35 pounds per suqare inch gauge.

26. A system according to claim 25 wherein the initially compressed contaminated air is heated to about 350° F.

27. A system according to claim 24 wherein said means for again expanding and controlling the temperature of a clean output air drives at least said means for again compressing the initially heated and compressed air.

28. A system according to claim 27 and additionally comprising means for circulating cooling air through said intial cooling means; and wherein said means for again expanding and controlling the temperature of the clean output air also drives said means for circulating cooling air through saids intial cooling means.

29. A system which receives initially compressed contaminated air at an elevated temperature and pressure and which directs clean air at a desirable temperature to the crew compartment of a vehicle when in an environment of contaimnated air, the improvement which comprises:
means for intially cooling the heated and compressed air for increasing the density of the air;
means for again compressing the initially heated and compressed air;
secondary cooling means for again cooling the heated and compressed air for decreasing the temperature of the contaminated air;
means for directing the contaminated air received from said second cooling means through a regenerative pressure swing absorption system for providing clean output air with the contaminates removed therefrom; and
means for expanding and controlling the temperature of the clean output air before discharging the clean output air into the crew compartment of the vehicle for use by the crew.

30. A system according to claim 29 wherein said means for again expanding and controlling the temperature of the clean output air drives at least said means for again compressing the initially heated and compressed air.

31. A system which receives initially compressed contaminated air at an elevated temperature and pressure and which dircts clean air at a desirable temperature to the crew compartment of a vehicle when in an environment of contaminated air, the improvement which comprises:
means for again compressing the initially heated and compressed air;
at least one cooling means for cooling the heated and compressed air for decreasing the temperature of the contaminated air;
means for directing the contaminated air received from said at least on cooling means through a regenerative pressure swing adsorption system for providing clean output with the contaminates removed therefrom and
means for expanding and controlling the temperature of the clean output air before discharging the clean output air into the crew compartment of the vehicle for use by the crew.

32. A system according to claim 31 wherein said means from again expanding and controlling the temperature of the clean output air drives at least said means for again compressing the initially heated and compressed air.

* * * * *